United States Patent
Jessop

(10) Patent No.: US 8,711,355 B2
(45) Date of Patent: Apr. 29, 2014

(54) METHOD FOR EVALUATING PERFORMANCE CHARACTERISTICS OF DENTAL CURING LIGHTS

(75) Inventor: Neil T. Jessop, Sandy, UT (US)

(73) Assignee: Ultradent Products, Inc., South Jordan, UT (US)

( * ) Notice: Subject to any disclaimer, the term of this patent is extended or adjusted under 35 U.S.C. 154(b) by 191 days.

(21) Appl. No.: 13/078,657

(22) Filed: Apr. 1, 2011

(65) Prior Publication Data

US 2011/0242536 A1   Oct. 6, 2011

Related U.S. Application Data

(60) Provisional application No. 61/320,633, filed on Apr. 2, 2010.

(51) Int. Cl.
*G01J 3/46* (2006.01)
(52) U.S. Cl.
USPC .......................................................... 356/402
(58) Field of Classification Search
USPC .......................................................... 356/402
See application file for complete search history.

(56) References Cited

U.S. PATENT DOCUMENTS

| | | | |
|---|---|---|---|
| 2003/0136844 A1* | 7/2003 | Dvorkis | 235/472.01 |
| 2004/0147399 A1* | 7/2004 | Gore | 503/221 |
| 2006/0073342 A1* | 4/2006 | Ariga et al. | 428/413 |
| 2007/0259598 A1* | 11/2007 | Ribi | 446/385 |
| 2008/0057000 A1* | 3/2008 | Loveridge | 424/9.7 |

OTHER PUBLICATIONS

Absorbance Graph, Reversacol Photochromic Dyes, http://www.photochromics.co.uk/absorbance.htm, 2010, p. 1, Vivimed Labs Europe Ltd.
Application Information, Reversacol Photochromic Dyes, http://www.photochromics.co.uk/appadvice.htm, 2010, p. 1, Vivimed Labs Europe Ltd.
Contact Us, Reversacol Photochromic Dyes, http://www.photochromics.co.uk/contact.htm, 2010, p. 1, Vivimed Labs Europe Ltd.
Contact, LCR Hallcrest—Temperature Triggered Color Changing Technology and Graphics, www.hallcrest.com/contact.cfm, 1999-2011, 2 pages, Liquid Crystal Resources, L.L.C.
Mechanism, Reversacol Photochromic Dyes, http://www.photochromics.co.uk/mechanism.htm, 2010, pp. 1-2, Vivimed Labs Europe Ltd.
Nogami, et al., Photochromism of spiropyran doped in Al2O3-SiO2 gels prepared by the sol-gel process, Journal of Materials Science Letters, V. 12, 1993, p. 1544, Chapman & Hall.

(Continued)

*Primary Examiner* — Tarifur Chowdhury
*Assistant Examiner* — Abdullahi Nur
(74) *Attorney, Agent, or Firm* — Workman Nydegger

(57) ABSTRACT

The present invention is directed to methods and related systems for evaluating and demonstrating various performance characteristics of one or more dental curing lights. The method and system employs a performance evaluation member (e.g., in the shape of a disc) comprising a carrier material (e.g., any of various suitable polymeric materials) and a color-changing material on or within (e.g., impregnated within) the body material. A user is able to use the performance evaluation member to demonstrate and evaluate performance characteristics relating to the presence of particularly desired wavelengths within the light emitted by a dental curing light, footprint size and shape of emitted light, uniformity of intensity within the emitted footprint, as well as relative intensities of desired wavelengths provided by two or more dental curing lights.

26 Claims, 5 Drawing Sheets

(56) References Cited

OTHER PUBLICATIONS

Ohsumi, et al., Chemical control of the photochromic reactivity of diarylethene derivatives, Communication, www.rsc.org/chemcomm, Chem. Commun., 2005, pp. 3921-3923, The Royal Society of Chemistry 2005.

Product Range, Main Products Page, http://www.jamesrobinson.eu.com/jr/jrphotoprods.nsf/look/main%20products%20page, Apr. 1, 2010, 1 page.

Robinson, James, Reversal Photochromic Dyes, at least as early as Apr. 1, 2010, 8 pages.

Technical Data Summary, Technical Data Page, http://www.jamesrobinson.ltd.uk/jr/jrphotoprods.nsf/look/Technical%20Data%20Page, Apr. 1, 2010, 1 page.

Technical Terms, Reversacol Photochromic Dyes, http://www.photochromics.co.uk/glossary.htm, 2010, pp. 1-2, Vivimed Labs Europe Ltd.

The World's Leading Producer of Color Change Temperature Indicating Graphic Devices & Materials, LCR Hallcrest—Temperature Triggered Color Changing Technology and Graphics, www.hallcrest.com, 1999-2011, 1 page, Liquid Crystal Resources, L.L.C.

Types of Photochromics, Reversacol Photochromic Dyes, http://www.photochromics.co.uk/phototypes.htm, 2010, p. 1, Vivimed Labs Europe Ltd.

VALO—The Right Power in the Right Place, at least as early as Apr. 1, 2010, pp. 1-8.

\* cited by examiner

METHOD FOR EVALUATING PERFORMANCE CHARACTERISTICS OF DENTAL CURING LIGHTS

CROSS-REFERENCE TO RELATED APPLICATIONS

The present application claims the benefit of U.S. Provisional Patent Application Ser. No. 61/320,633 filed Apr. 2, 2010 and entitled METHOD FOR EVALUATING PERFORMANCE CHARACTERISTICS OF DENTAL CURING LIGHTS, herein incorporated by reference in its entirety.

BACKGROUND

1. The Field of the Invention

The present invention generally relates to the field of dental curing lights. More particularly, the invention relates to methods for use in demonstrating, evaluating, and comparing performance characteristics of one or more dental curing lights.

2. The Relevant Technology

In the field of dentistry, dental cavities or preparations are often filled and/or sealed with photosensitive dental compositions that are cured by exposure to radiant energy, such as visible light. These compositions, commonly referred to as light-curable compositions, are placed within dental cavity preparations or onto dental surfaces where they are subsequently irradiated by light. The radiated light causes photosensitive components within the compositions to initiate polymerization of polymerizable components, thereby hardening the light-curable composition within the dental cavity preparation or other dental surface.

Light-curing devices are typically configured with a light source, such as a quartz-tungsten-halogen (QTH) bulb, plasma arc light source, or light emitting diodes (LEDs). QTH bulbs are particularly useful because they generate a broad spectrum of light that can be used to cure a broad range of polymerizable compositions, although QTH bulbs generate substantial waste heat and require bulky surrounding structure to draw waste heat away from the bulb and to dissipate the waste heat. LEDs are significantly smaller, require less power, and emit less heat but only radiate light at a specific peak wavelength and a narrow range surrounding the peak wavelength. Multiple LEDs emitting at a different peak wavelength are therefore used in some cases to provide broader spectrum light. With many light-curing devices available, it can be difficult to compare and evaluate various performance characteristics of different curing lights by the naked eye.

BRIEF SUMMARY

The present invention is directed to methods and related systems for evaluating, comparing, and demonstrating various performance characteristics of one or more dental curing lights. The method and system employs a performance evaluation member (e.g., a disc) comprising a carrier material (e.g., any of various suitable polymeric materials) and a light sensitive color-changing material on or within (e.g., impregnated within) the carrier material. The performance evaluation member may be provided in any desired shape or configuration. In one embodiment, the member comprises a thin circular disc (e.g., about 1 mm thick with about a 2 cm or about a 3 cm diameter). Other shapes (e.g., square, rectangular, oval, etc.) and thicknesses could alternatively be used. A user is able to use the performance evaluation member to demonstrate and evaluate performance characteristics relating to the presence of particularly desired wavelengths within the light emitted by a given dental curing light. A user is also able to evaluate other characteristics associated with the given dental curing light, such as footprint size and shape of emitted light, distribution of light intensity within the emitted footprint, and relative intensities of desired wavelengths provided by two or more different dental curing lights.

These and other benefits, advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

I. Introduction

Figure 1:
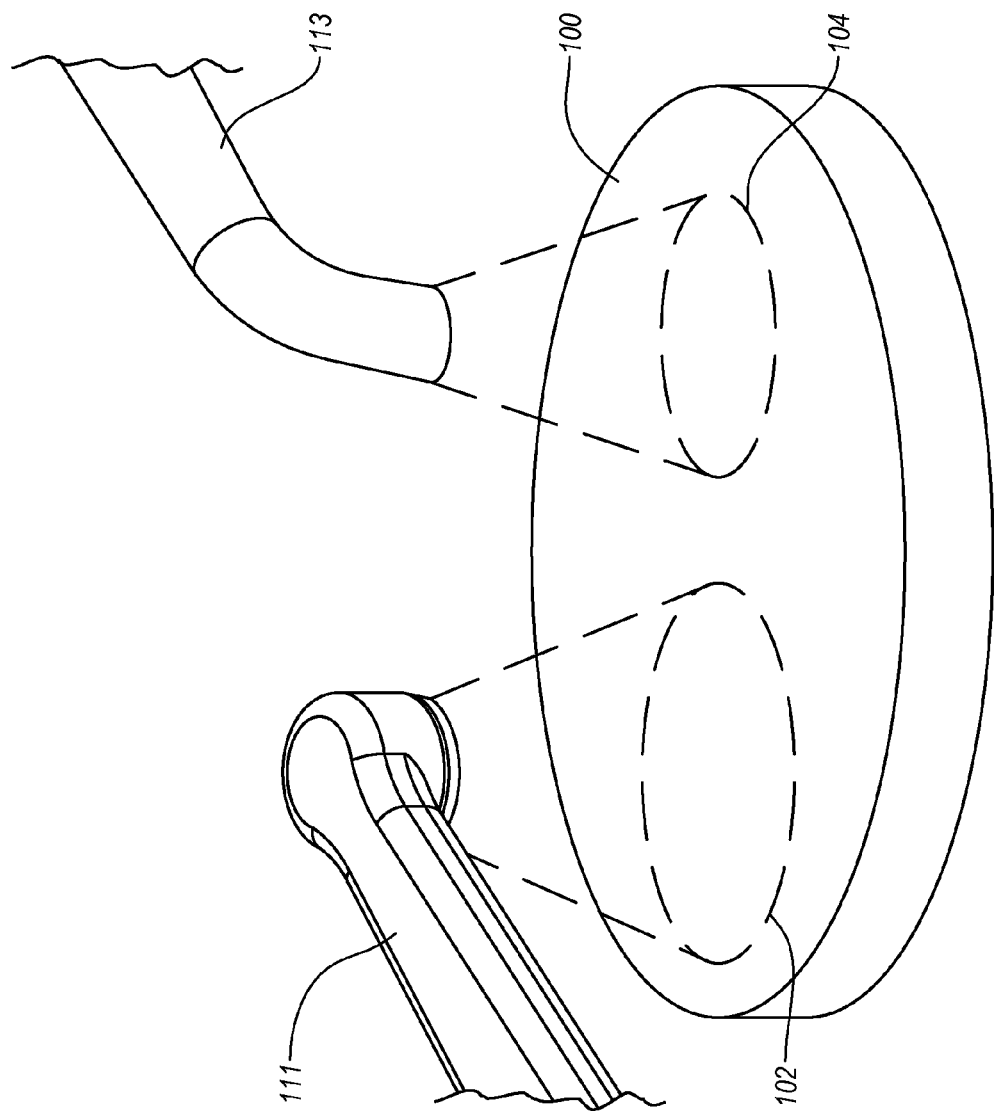
FIG. 1 depicts an exemplary performance evaluation member in the shape of a disc in which two different dental curing lights are simultaneously being used to illuminate different portions of the member.

The present invention is directed to methods and related systems for evaluating, comparing, and demonstrating various performance characteristics of one or more dental curing lights. The method and system employs a performance evaluation member (e.g., a disc) comprising a carrier material (e.g., any of various suitable polymeric materials) and a light sensitive color-changing material on or within (e.g., impregnated within) the carrier material. The performance evaluation member may be provided in any desired shape or configuration. In one embodiment, the member comprises a thin circular disc (e.g., about 1 mm thick with a diameter of about 2 cm to about 3 cm). Other shapes (e.g., square, rectangular, oval, etc.) and thicknesses could alternatively be used.

A user is able to use the performance evaluation member to demonstrate and evaluate performance characteristics relating to the presence of particularly desired wavelengths within the light emitted by a dental curing light. In addition, a user may also evaluate other performance characteristics associated with a given dental curing light, including, but not limited to, footprint size and shape of emitted light, as well as distribution of light intensity within the emitted footprint. When comparing two different dental curing lights, a user may also evaluate relative intensities of desired wavelengths provided by the two or more dental curing lights.

II. Exemplary Performance Evaluation Members

In one embodiment, the color-changing material comprises a photochromic material, which changes color upon exposure to a given wavelength or range of wavelengths of light. In an alternative embodiment, the color-changing material may comprise a phosphorescent material, which emits light upon exposure to a given wavelength or range of wavelengths of light. In one embodiment, the color-changing material is specifically configured to change color upon exposure to a wavelength of light corresponding to a desired curing light wavelength.

For example, many light curable compositions are initiated by exposure to light having a peak wavelength between about 460 nm and about 470 nm. In one embodiment, the color-changing material is selected so that it changes color upon exposure to 460 nm to 470 nm wavelength light. Other light curable composition are initiated by exposure to light of shorter peak wavelengths, for example between about 445 nm and about 455 nm, or even shorter wavelengths, for example between about 400 nm and about 410 nm. As such, the color-changing material may be selected so as to be activated (i.e., change color) upon exposure to one or more of these wavelengths. More than one color-changing material may be incorporated into the member. In addition, more than one performance evaluation member (with different activating characteristics) may be employed in evaluating one or more dental curing lights. In one embodiment the initial color of the color changing material is substantially colorless (i.e., clear) or substantially white, while the activated color is one that provides a high level of contrast relative to the initial color (e.g., red, green, blue, purple, black, etc.)

According to one method, a dental curing light to be evaluated is provided, and the performance evaluation member is illuminated with light emitted by the dental curing light. Illuminating the member with light from the subject dental curing light may demonstrate one or more performance characteristics of the dental curing light. For example, if a color change occurs, the user knows that the dental curing light emits light of about the wavelength that activates the color-changing material within the member. For example, different performance evaluation members including different color-changing materials can be used to evaluate whether a dental curing light emits light at about 465 nm, about 450 nm, and/or about 405 nm.

In addition to demonstrating the presence of any particular wavelength or range thereof within the light output emitted by the tested dental curing light, the performance member may also demonstrate the relative intensity of any desirable light wavelength. For example, when evaluating two different dental curing lights, the user may illuminate different portions of the disc or other member with both lights, and the difference in color intensity and/or color duration of the activated color-changing material provides an indication of the relative intensities provided by each dental curing light.

Similarly, the disc or other member may be illuminated to demonstrate differences of footprint shape and/or size provided by two different dental curing lights. The disc or other member may further reveal information relative to uniformity or lack thereof of the activating wavelength within the footprint of the dental curing light. For example, if a dental curing light is capable of emitting a desired wavelength (e.g., 405 nm), but that wavelength is not evenly distributed over the footprint of total light emission provided by the dental curing light, the disc or other member can reveal these performance characteristics (e.g., by having darker and lighter color-changed regions within the footprint). Although testing is described above in the context of a single disc or member being illuminated by two dental curing lights to be compared, similar tests could be conducted with two identical performance evaluation members, each illuminated by a different dental curing light.

In one embodiment the color-changing material which changes color in response to exposure to a given wavelength of light comprises one or more photochromic materials. Exemplary photochromic materials include spironaphthoxazines and/or naphthopyrans. Spironaphthoxazines are believed to have the chemical structure shown below.

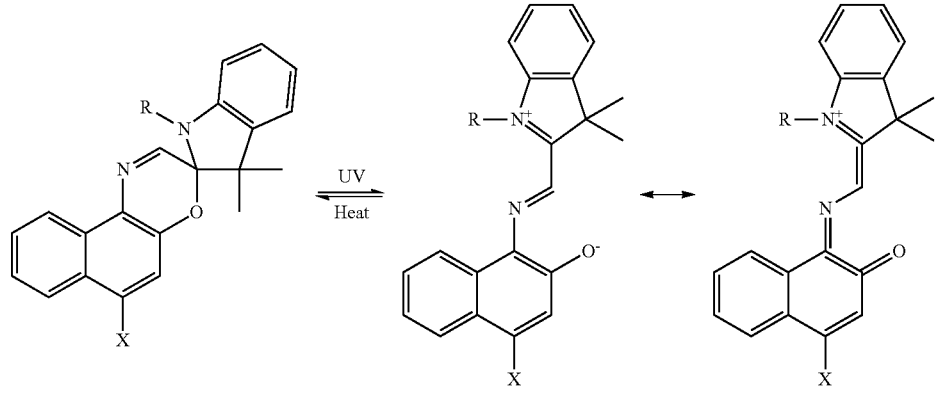

Spiro-naphthoxazines

Naphthopyrans are believed to have the chemical structure shown below.

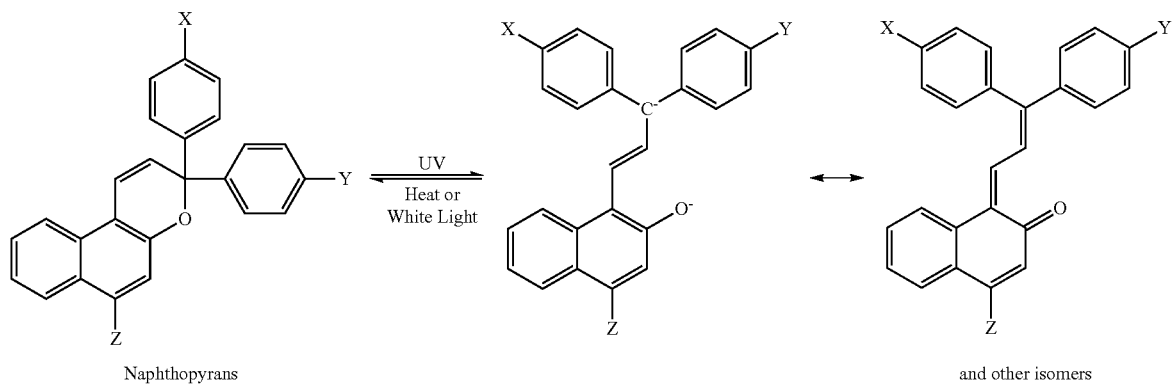

Naphthopyrans and other isomers

Suitable photochromic materials comprising dyes based on spironaphthoxazines and/or naphthopyrans are available from James Robinson Ltd., located in Huddersfield, United Kingdom. Various such photochromic dyes are available under the trade name REVERSACOL. Exemplary REVERSACOL dyes include Solar Yellow, Rush Yellow, Sunflower, Corn Yellow, Flame, Ruby, Berry Red, Poppy, Cardinal, Cherry, Lilac, Claret, Plum Red, Amethyst, Royal Purple, Oxford Blue, Velvet Blue, Storm Purple, Palatinate Purple, Aqua Green, Sea Green, Mulberry, Amber, Volcanic Grey, Heather, Misty Grey, Midnight Grey, and Graphite. Additional suitable photochromic materials are available from LCR Hallcrest, located in Glenview, Ill. Exemplary Hallcrest photochromic materials include UP10BL Blue photochromic powder, UP10P Purple photochromic powder, and UP10R Red photochromic powder.

Two or more photochromic materials may be combined into a single performance evaluation member. Various other color-changing materials will be apparent to one of skill in the art. Both the REVERSACOL dyes and the Hallcrest materials are typically provided in powder form, and may be mixed with a suitable carrier system (e.g., a plastic or polymeric body material) in order to provide the desired performance evaluation disc or other member. The photochromic materials may be incorporated into other carrier systems (e.g., within a suitable solvent so as to form a photochromic ink or dye). Such photochromic inks or dyes may be printed or otherwise coated onto any suitable substrate (e.g., paper, fabric, etc.). For example, the performance evaluation member may comprise a photochromic or other color-changing dye or ink printed onto a paper or other substrate in the form of a product brochure.

Preferred color-changing materials are activated by light wavelengths at about 470 nm and below, about 450 nm and below, or about 405 nm and below. In one embodiment, the color change may be initiated by a relatively narrow range of wavelengths centered between about 470 nm and about 460 nm. In another embodiment, the color change may be initiated by a relatively narrow range of wavelengths centered between about 455 nm and about 445 nm. In another embodiment, the color change may be initiated by a relatively narrow range of wavelengths centered between about 410 nm and about 400 nm. Such wavelengths correspond to those that activate initiators within curable dental materials.

In one embodiment, it may be advantageous to provide a disc or other performance evaluation member including a color-changing material that is activated by UVA (i.e., about 350-400 nm), UVB (i.e., about 250-350 nm), or UVC (i.e., less than about 250 nm) wavelengths. Such performance evaluation member(s) would allow a user to evaluate whether a dental curing light emits one or more of these wavelength ranges. While UVA wavelengths may be suitable for initiating curing of some curable dental materials, UVB can damage skin (e.g., causing a sunburn) but may otherwise be suitable as a curing wavelength, while UVC wavelengths are known to be very harmful and carcinogenic. Identification of a dental curing light that emits UVC wavelengths would be helpful, as a practitioner would prefer to avoid use of such a dental curing light.

According to one embodiment, the photochromic or other color-changing material is preferably reversible, such that upon exposure to the activating wavelength of light, a color change occurs, and after a period of time after no longer being illuminated by the activating wavelength, the color-changing material returns to its original state. The duration of time it takes to return to the original state (i.e., the fade rate) typically depends on the particular color-changing material and carrier selected, as well as temperature conditions. Preferably, the color changing material selected is able to maintain activated color for between about 2 seconds and about 60 seconds, more preferably between about 5 seconds and about 40 seconds, after which the material fades back to its original state. These ranges allow the user sufficient time to evaluate the effect of the subject dental curing light on the disc or other member, demonstrating one or more performance characteristics of the dental curing light. Advantageously, the disc or other member eventually fades to its original color state, and may be used again. In an alternative embodiment, the color-change is irreversible, such that after evaluating the subject dental curing light(s) the disc or other member may simply be discarded, or may be used indefinitely to provide a visual display of the performance characteristics of the tested dental curing light(s).

In one embodiment, the color-changing material comprises between about 0.01 percent and about 2 percent of the performance evaluation member by weight. More preferably, the color-changing material comprises about 0.1 percent to about 1 percent of the performance evaluation member by weight, and most preferably the color-changing material comprises about 0.2 percent to about 0.5 percent of the performance evaluation member by weight.

The color-changing material may be mixed, coated on, or otherwise combined with a wide variety of suitable carrier materials. Exemplary carrier materials include, but are not limited to various polyolefins, (e.g., polyethylene, polypropylene, low density polyethylene), methacrylates, vinyls, nylons (e.g., crystalline and/or amorphous), polyetherimides, polycarbonates, polyaryletherketones, acetals, or combinations thereof. A specific example of a crystalline nylon is Trogamid, manufactured by Degussa AG, located in Germany. A specific example of a polyetherimide is ULTEM, manufactured by General Electric. A specific example of a polyaryletherketone is PEEK, manufactured by Victrex USA, Inc., located in Greenville, S.C. A specific example of an acetal is DELRIN, manufactured by DuPont. Carrier materials having flexural modulus values less than about 2000 MPa are preferred, as higher values (i.e., corresponding to stiffer materials) may interfere with the ability of a photochromic or other color-changing materials to twist into their colored form. Although relatively stiff materials may be used, such materials may exhibit a weaker photochromic or other color-changing response. Particularly preferred carrier materials include polyolefins, vinyls, and methacrylates.

Depending on the choice of carrier material, the carrier may be opaque, somewhat translucent, or even transparent. In one embodiment it is preferred that the disc or other performance evaluation member not be completely opaque nor transparent. It is preferred that the member be at least somewhat translucent (e.g., a milky appearance) or somewhat opaque. Although the member could be transparent, it is preferred that the disc or other member have at least some degree of opacity so that both sides of the member can be used. If the member is transparent, use of the first side inhibits the ability to clearly demonstrate, observe, and evaluate a dental curing light using the opposite side.

As such, it may be preferable to add an opacifying agent (e.g., titanium dioxide) to transparent carrier materials to provide at least some degree of opacity. At the same time, it is preferred that the disc or other member not be completely opaque, so as to allow the light emitted by the tested dental curing light to penetrate into the member, thereby activating the color-changing material mixed or otherwise present with the carrier material. In one embodiment, the initial coloring of the performance evaluation member is a light color (e.g., white or nearly white) and the color changing material changes to a color providing a high contrast to the initial color.

Preferably the unactivated member (i.e., before exposure to activating wavelength light) has a milky somewhat translucent appearance. Depending on the unactivated appearance of the color-changing material, as well as the carrier material, the member may have a color tint in its unactivated state. For example, it may appear as a pale white, pale green, pale blue, pale red, or other initial color depending on the components included. When titanium dioxide or other opacifier is included, the opacifier may comprise between about 0.001 percent and about 0.5 percent by weight, more preferably between about 0.005 percent and about 0.1 percent by weight, and most preferably between about 0.01 percent and about 0.05 percent by weight of the performance evaluation member.

Any type dental curing light using any of various light sources may be evaluated with the inventive methods and systems. For example, although typically all dental curing lights include a body having a handle portion and a light emitting distal end (whether the body is gun-shaped, wand shaped, or other shaped), the light sources employed may vary. For example, some dental curing lights employ a QTH bulb, others employ a plasma arc light source, and others employ one or more LEDs.

FIG. 1 is a perspective view of an exemplary performance evaluation member 100 in the shape of a relatively thin disc, with a first dental curing light 111 and a second dental curing light 113 being used to simultaneously illuminate different portions of disc 100 to evaluate one or more performance characteristics of the dental curing lights 111 and 113, respectively.

Without limitation, the following examples illustrate some exemplary implementations of the present invention:

Example 1

A performance evaluation member is formed by combining a methacrylate resin carrier material with photochromic materials and an opacifier in the amounts below:

| Component | Amount |
| --- | --- |
| Methacrylate resin | 99.57% |
| UP10P Purple photochromic powder | 0.2% |
| Palatinate Purple photochromic powder | 0.2% |
| Titanium dioxide | 0.03% |

The mixture is shaped into a thin flat disc shaped performance evaluation member that exhibits a milky white appearance prior to activation of the color-changing materials. Upon activation of the color changing materials (e.g., exposure to wavelengths of light less than about 450 nm), the activated portion of the disc turns a deep purple color. When evaluating dental curing lights, the disc is able to demonstrate the ability of a tested dental curing light to emit light below about 450 nm. The disc is also able to demonstrate the relative intensities of light emitted below about 450 nm. For example, the intensity of the purple color appearing upon activation is demonstrative and indicative of the intensity of 450 nm and lower wavelengths emitted by one dental curing light as compared to another. In other words, by comparing relative purple color intensities resulting from each dental curing light, a user is able to empirically evaluate intensities provided by the two dental curing lights. The disc is also able to demonstrate footprint size and shape provided by each tested dental curing light. The disc is further able to reveal uniformity or lack thereof of 450 nm and lower wavelength light within the footprint.

Example 2

A performance evaluation member is formed by combining a methacrylate resin carrier material with photochromic materials and an opacifier in the amounts below:

| Component | Amount |
| --- | --- |
| Methacrylate resin | 99.57% |
| UP10B Blue photochromic powder | 0.2% |
| UP10R Red photochromic powder | 0.2% |
| Titanium dioxide | 0.03% |

The mixture is shaped into a thin flat disc shaped performance evaluation member that exhibits a milky pale green appearance prior to activation of the color-changing materials. Upon activation of the color changing materials (e.g., exposure to wavelengths of light less than about 470 nm), the activated portion of the disc turns a deep bluish color. When evaluating dental curing lights, the disc is able to demonstrate the ability of a tested dental curing light to emit light below about 470 nm. The disc is also able to demonstrate the relative intensities of light emitted below about 470 nm. For example, the intensity of the blue color appearing upon activation is demonstrative and indicative of the intensity of 470 nm and lower wavelengths emitted by one dental curing light as compared to another (i.e., by comparing relative blue color intensities resulting from each dental curing light). The disc is also able to demonstrate footprint size and shape provided by each tested dental curing light. The disc is further able to reveal uniformity or lack thereof of 470 nm and lower wavelength light within the footprint. When the performance evaluation disc of Example 1 is used in combination with the disc of Example 2, a user is able to better evaluate a dental curing light's ability to emit desired wavelengths, the footprint shape, size, and uniformity of those wavelengths (i.e., less than about 450 nm and less than about 470 nm), as well as the relative intensities of the desired wavelengths emitted by different dental curing lights.

Example 3

A performance evaluation member is formed by combining a methacrylate resin carrier material with a photochromic material and an opacifier in the amounts below:

| Component | Amount |
|---|---|
| Amoco 7934 polypropylene | 99.64% |
| UP10R Red photochromic powder | 0.33% |
| Titanium dioxide | 0.03% |

The mixture is injection molded into a thin flat disc shaped performance evaluation member that exhibits a milky white appearance prior to activation of the color-changing materials. Upon activation of the color changing material the activated portion of the disc turns a deep red color. When evaluating dental curing lights, the disc is able to demonstrate the ability of a tested dental curing light to emit curing light wavelengths. The disc is also able to demonstrate the relative intensities of curing light wavelengths. For example, the intensity of the red color appearing upon activation is demonstrative and indicative of the intensity of curing light wavelengths emitted by one dental curing light as compared to another (i.e., by comparing relative red color intensities resulting from each dental curing light). The disc is also able to demonstrate footprint size and shape provided by each tested dental curing light. The disc is further able to reveal uniformity or lack thereof of curing light wavelengths within the footprint.

FIGS. 2-5 illustrate use of discs similar to those described in Examples 1 and 2 used to evaluate various performance characteristics (e.g., footprint size, footprint uniformity, relative emission intensities, presence of particular desired wavelengths), of the Ultradent Valo dental curing light, the Kerr Demi dental curing light, and the Ivoclar Blue Phase G2 dental curing light.

Figure 2:
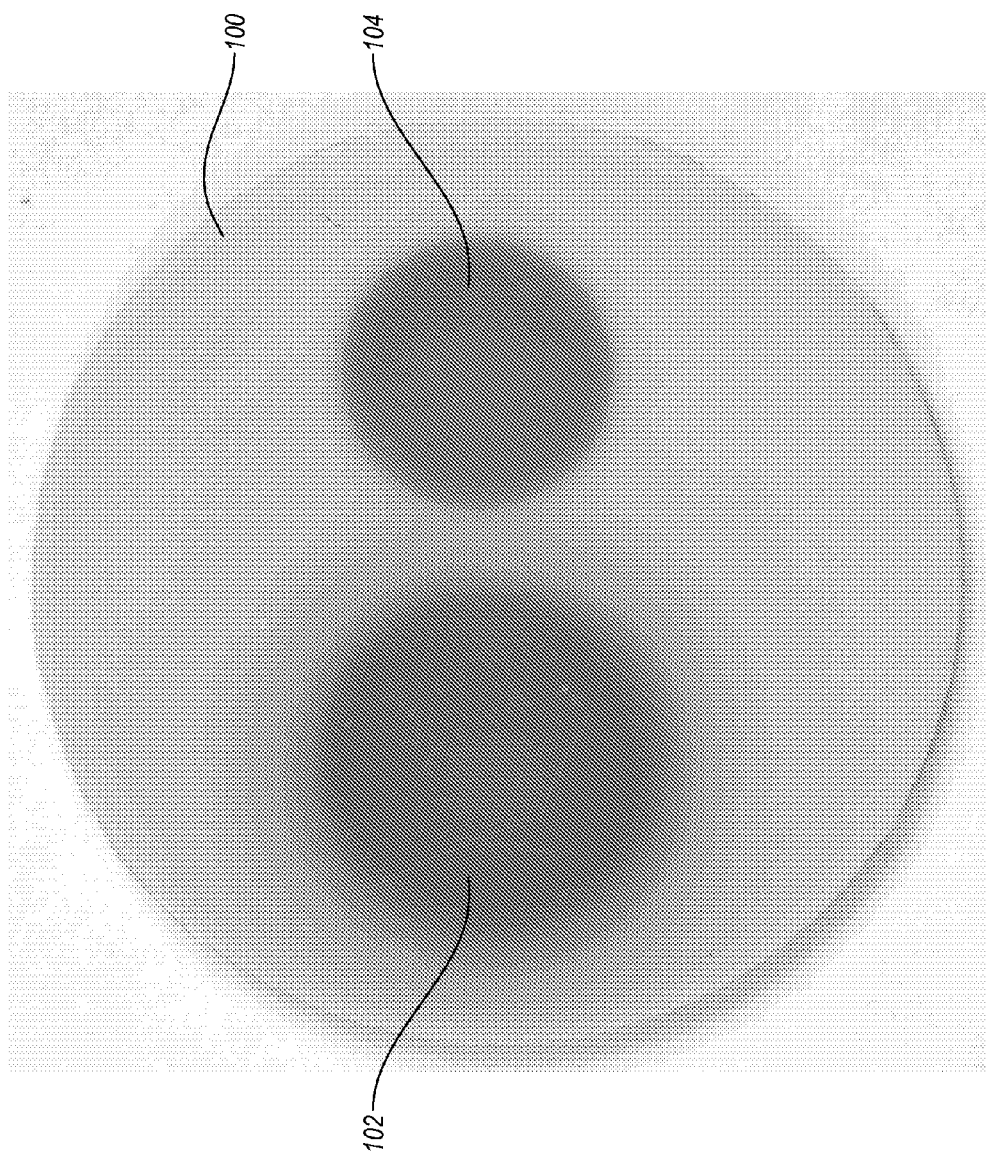
FIG. 2 shows a photograph of a disc similar to that described in Example 2 which has been exposed to light emitted by the Valo and the Kerr Demi.
Figure 3:
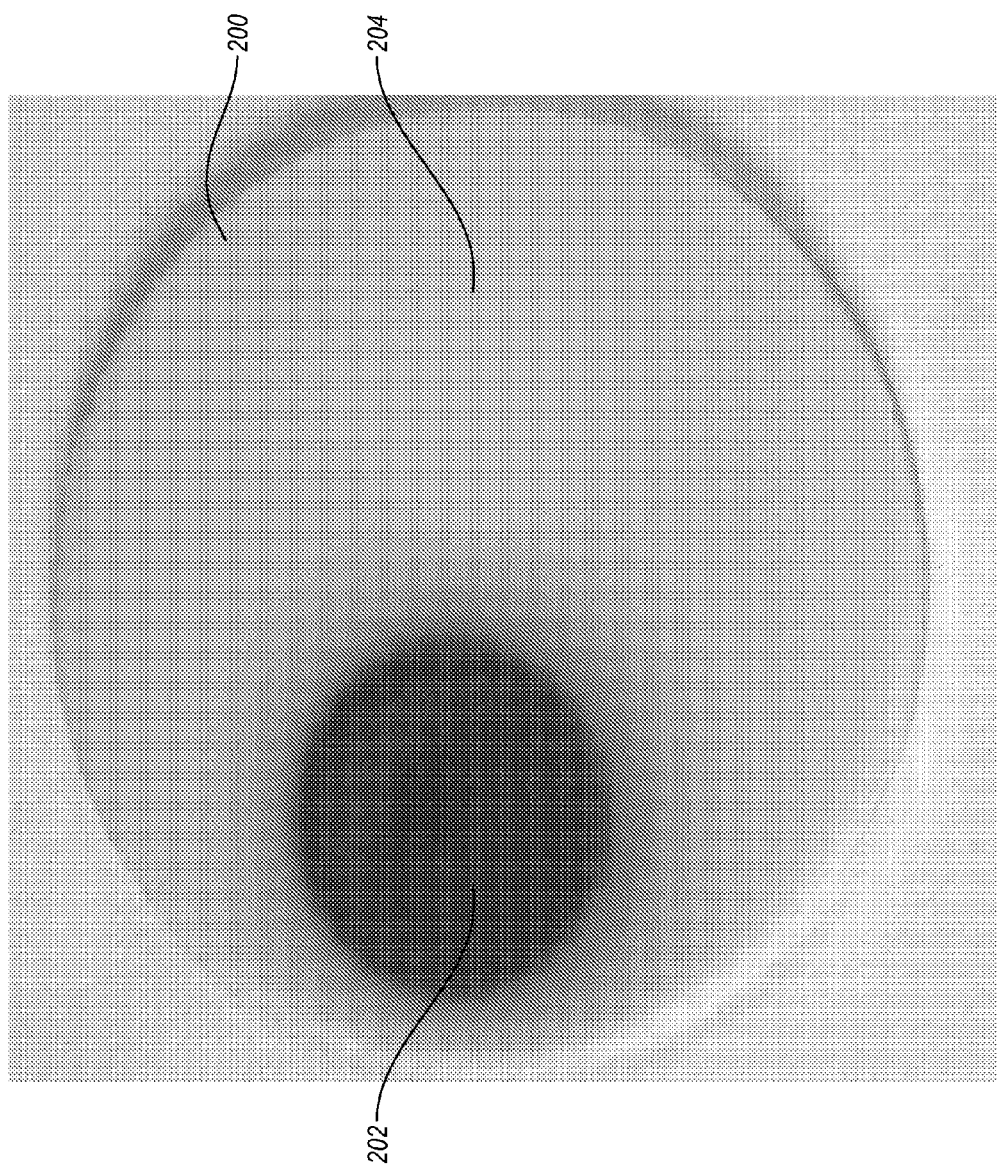
FIG. 3 shows a photograph of a disc similar to that described in Example 1 which has been exposed to light emitted by the Valo and the Kerr Demi.
Figure 4:
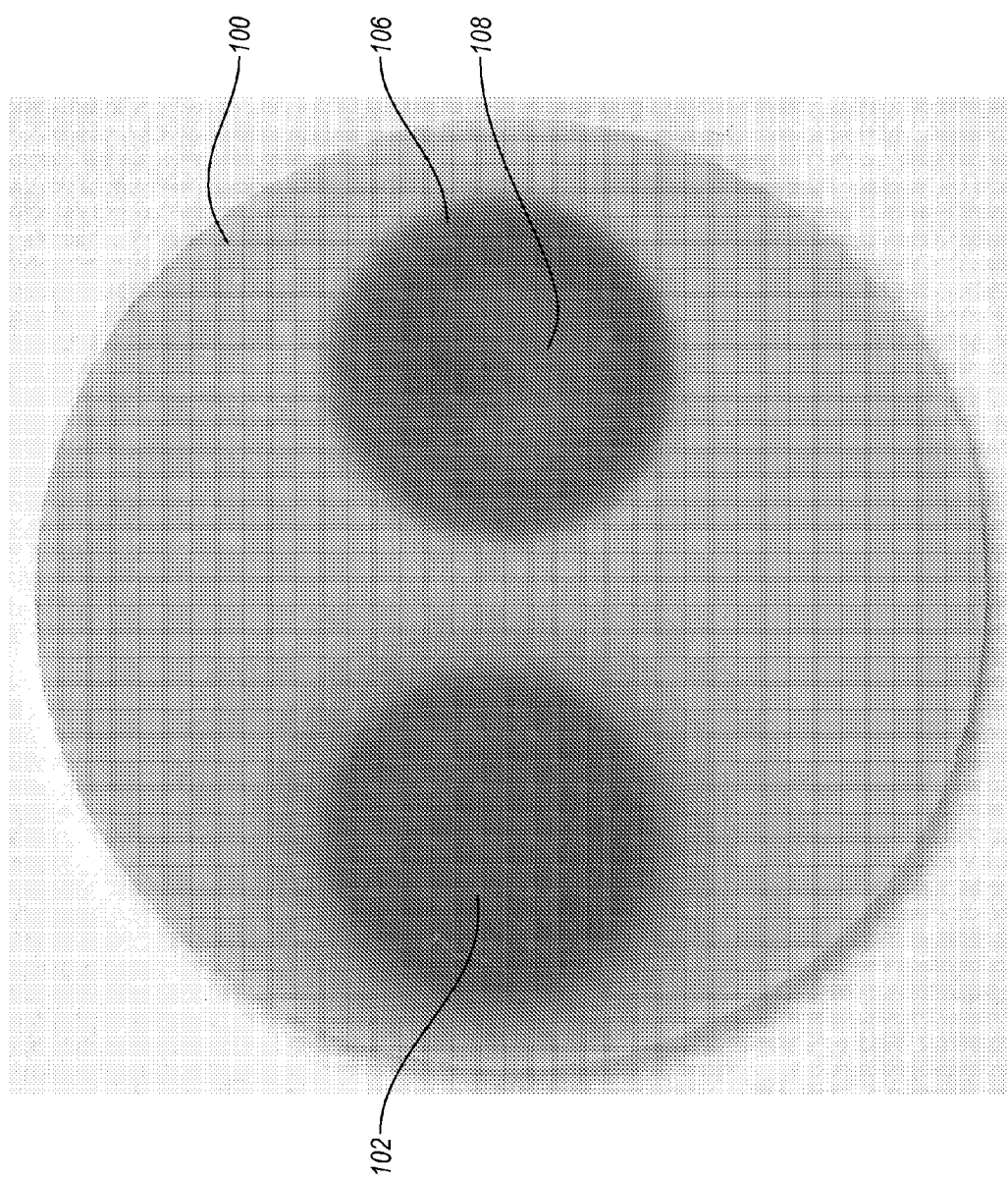
FIG. 4 shows a photograph of a disc similar to that of FIG. 2 which has been exposed to light emitted by the Valo and the Ivoclar Blue Phase G2.
Figure 5:
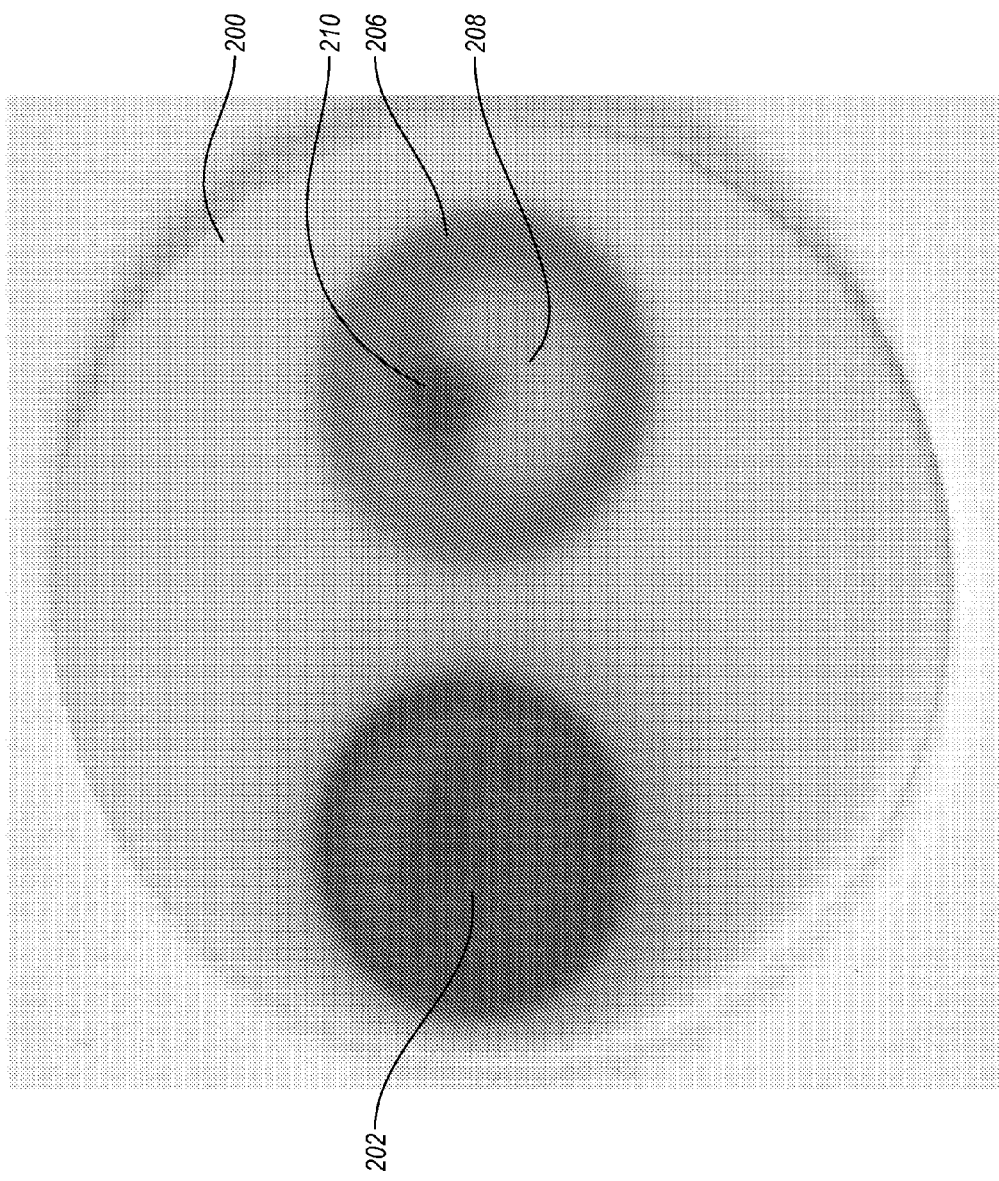
FIG. 5 shows a photograph of a disc similar to that of FIG. 3 which has been exposed to light emitted by the Valo and the Ivoclar Blue Phase G2.

For example, FIG. 2 shows a disc 100 similar to that described in Example 2 which has been exposed to light emitted by the Valo at 102 and the Kerr Demi at 104. The Valo color changed portion 102 provides a significantly larger footprint as compared to the Kerr Demi color changed portion 104. FIG. 3 shows a disc 200 similar to that described in Example 1 which has been exposed to light emitted by the Valo at 202 and the Kerr Demi at 204. The Kerr Demi results in substantially no color change at 204, indicating that the Kerr Demi emits little or no wavelengths below about 450 nm. FIG. 4 shows a disc 100 similar to that described in Example 2 which has been exposed to light emitted by the Valo at 102 and the Ivoclar Blue Phase G2 at 106. The Valo presents a substantially uniform footprint at 102, while the Ivoclar shows a somewhat irregular light pattern 106 with a portion 108 below the center of the footprint showing a less intense blue color. FIG. 5 shows a disc 200 similar to that described in Example 1 which has been exposed to light emitted by the Valo at 202 and the Ivoclar Blue Phase G2 at 206. In FIG. 5, the irregularity of the light pattern 206 emitted by the Ivoclar Blue Phase G2 is very apparent, with a large portion 208 below the center of the footprint 206 showing a much less intense purple color, a small portion 210 just above center with highest intensity, and the remainder of the footprint 206 showing an intermediate intensity. The uniformity of the Valo in both FIGS. 4 and 5 is substantially even across the entire footprint 102 and 202, respectively.

As used in this specification and the appended claims, the singular forms "a," "an" and "the" include plural referents unless the context clearly dictates otherwise.

It will also be appreciated that the present claimed invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A performance evaluation device for evaluating one or more performance characteristics of a light-emitting device, comprising: a non-polymerizable carrier material having a substantially uniform thickness or flat configuration; and one or more photochromic materials on or within the carrier material, the one or more photochromic materials changing color upon illumination with light of one or more specified wavelengths, the performance evaluation device, when at least partially illuminated with a footprint of light from a light-emitting device, demonstrating one or more performance characteristics of the light-emitting device, wherein the one or more performance characteristics are selected from the group consisting of (i) size and shape of a footprint of light emitted by the light-emitting device, (ii) uniformity of a footprint of light emitted by the light-emitting device, (iii) presence of one or more specific wavelengths within a footprint of light emitted by the light-emitting device, (iv) location of one or more wavelengths within a footprint of light emitted by the light-emitting device, and (v) intensity of one or more wavelengths within a footprint of light emitted by the light-emitting device.

2. A performance evaluation device as defined in claim 1, wherein the one or more photochromic materials comprise a plurality of photochromic materials.

3. A performance evaluation device as defined in claim 1, wherein the performance evaluation device demonstrates presence or absence of one or more specified wavelengths when illuminated with light emitted by a light-emitting device.

4. A performance evaluation device as defined in claim 1, wherein the performance evaluation device demonstrates relative light intensity characteristics of light emitted by each of a plurality of different light-emitting devices.

5. A performance evaluation device as defined in claim 4, wherein the performance evaluation device demonstrates footprint shape and/or footprint size characteristics of each of the plurality of different light-emitting devices.

6. A performance evaluation device as defined in claim 2, wherein the performance evaluation device demonstrates relative location and/or uniformity of multiple wavelengths of light within the footprint of light emitted by a light-emitting device.

7. A performance evaluation device as defined in claim 1, wherein a color change of the one or more photochromic materials is reversible so that the one or more photochromic materials change back to an original state in a period of time after no longer being illuminated with light emitted by a light-emitting device.

8. A performance evaluation device as defined in claim 1, wherein a color change of the one or more photochromic materials is irreversible so that the one or more photochromic materials do not change back to an original state after no longer being illuminated with light emitted by a light-emitting device.

9. A performance evaluation device as defined in claim 1, wherein the non-polymerizable carrier material comprises a polymeric material.

10. A performance evaluation device as defined in claim 9, wherein the polymeric material is selected from the group consisting of polyethylene, polypropylene, low density polyethylene, other polyolefins, methacrylates, vinyls, nylons, polyetherimides, polycarbonates, polyaryletherketones, acetals, and combinations thereof.

11. A performance evaluation device as defined in claim 1, wherein the one or more photochromic color-changing materials comprise a blend of photochromic materials that individually change to different colors when illuminated with specified wavelengths of light.

12. A performance evaluation device as defined in claim 1, wherein the one or more photochromic color-changing materials are positioned in different regions of the carrier material that individually change to different colors when illuminated with specified wavelengths of light.

13. A kit of performance evaluation devices comprising a plurality of performance evaluation devices as defined in claim 1, at least one of which includes a first photochromic material and at least one other of which includes a second photochromic material different than the first photochromic material.

14. A performance evaluation device as defined in claim 1, wherein the carrier material comprises a solid disc or substantially flat solid carrier material.

15. A performance evaluation device as defined in claim 1, wherein the performance evaluation device further comprises an opacifier.

16. A performance evaluation device as defined in claim 15, wherein the opacifier comprises titanium dioxide.

17. A performance evaluation device as defined in claim 15, wherein the opacifier comprises between about 0.001 percent and about 0.5 percent of the performance evaluation device by weight.

18. A performance evaluation device as defined in claim 15, wherein the opacifier comprises between about 0.005 percent and about 0.1 percent of the performance evaluation device by weight.

19. A performance evaluation device as defined in claim 15, wherein the opacifier comprises between about 0.01 percent and about 0.05 percent of the performance evaluation device by weight.

20. A performance evaluation device as defined in claim 1, wherein the performance evaluation member has a milky translucent appearance prior to activation of the one or more photochromic materials.

21. A performance evaluation member for evaluating one or more performance characteristics of a light-emitting device, the performance evaluation member comprising: a carrier material having a substantially uniform thickness or flat configuration comprising a polymer or paper substrate; and a photochromic material on or within the carrier material, the photochromic material changing color upon illumination with light from a light-emitting device so as to demonstrate one or more performance characteristics of the light-emitting device, wherein the one or more performance characteristics are selected from the group consisting of (i) size and shape of a footprint of light emitted by the light-emitting device, (ii) uniformity of a footprint of light emitted by the light-emitting device, (iii) presence of one or more specific wavelengths within a footprint of light emitted by the light-emitting device, (iv) location of one or more wavelengths within a footprint of light emitted by the light-emitting device, and (v) intensity of one or more wavelengths within a footprint of light emitted by the light-emitting device.

22. A performance evaluation member as defined in claim 21, wherein the carrier material comprises paper substrate.

23. A kit for evaluating performance characteristics of a dental curing light, the kit comprising a plurality of performance evaluation members according to claim 21, wherein at least two of the plurality of performance evaluation members have different photochromic materials on or within the carrier material so as to evaluate different performance characteristics of light emitted by one or more dental curing lights.

24. A method for comparing performance characteristics of a plurality of light emitting-devices, the method comprising: providing one or more performance evaluation members for evaluating one or more performance characteristics of the plurality of light emitting-devices, each performance evaluation member comprising: a carrier material having a substantially uniform thickness or flat configuration; and one or more color-changing materials on or within the carrier material, the one or more color-changing materials changing color upon illumination with light of one or more specified wavelengths; illuminating the one or more performance evaluation members with light emitted by each of the light-emitting devices; and observing whether and/or how the one or more performance evaluation members change color so as to compare one or more performance characteristics of the light-emitting devices.

25. A performance evaluation member as defined in claim 21, wherein the performance evaluation member comprises a plurality of different photochromic materials that change color when illuminated with different wavelengths of light.

26. A kit for evaluating performance characteristics of one or more light-emitting devices, the kit comprising:
a plurality of performance evaluation members that change color when exposed to different specified wavelengths of light emitted by one or more light-emitting devices, wherein the plurality of performance evaluation members include:
a first performance evaluation member comprising a carrier material and a first photochromic material on or within the carrier material, the first photochromic material changing color upon illumination with a first wavelength of light so as to demonstrate a first performance characteristic of a light-emitting device; and
a second performance evaluation member comprising a carrier material and a second photochromic material different than the first photochromic material on or within the carrier material, the second photochromic material changing color upon illumination with a second wavelength of light different than the first wavelength of light so as to demonstrate a second performance characteristic different than the first performance characteristic.

* * * * *